Sept. 18, 1962 H. G. MÖLLER ETAL 3,055,000
RADAR SET
Filed Nov. 16, 1956 7 Sheets-Sheet 1

INVENTORS
Hans Georg Möller,
Friedrich Wilhelm Kallmeyer
by Ezekiel Wolf
their attorney.

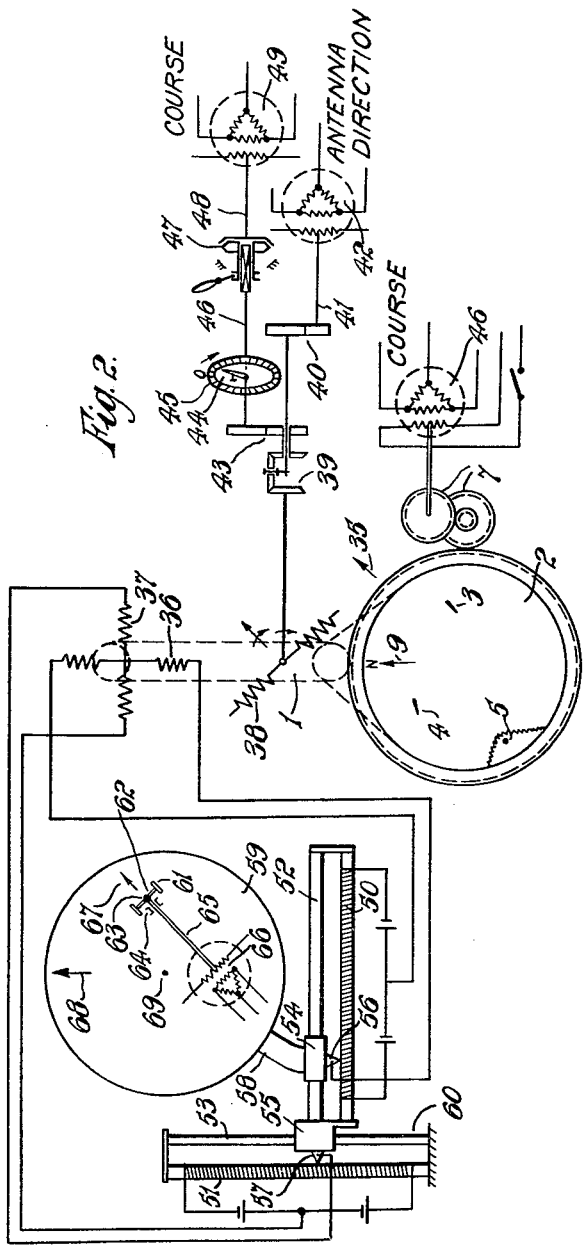

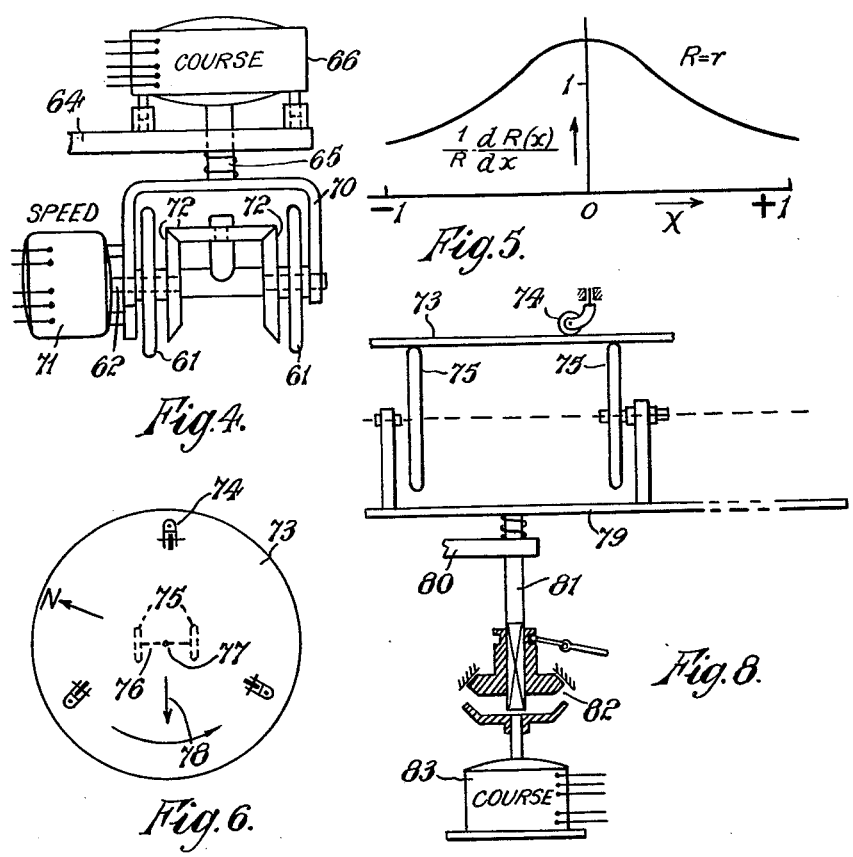
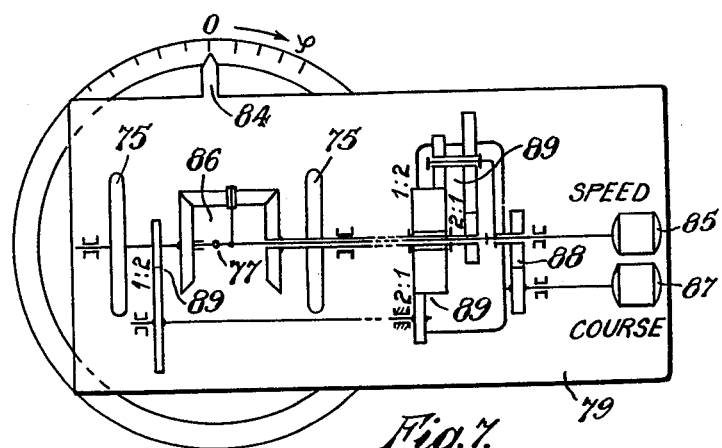

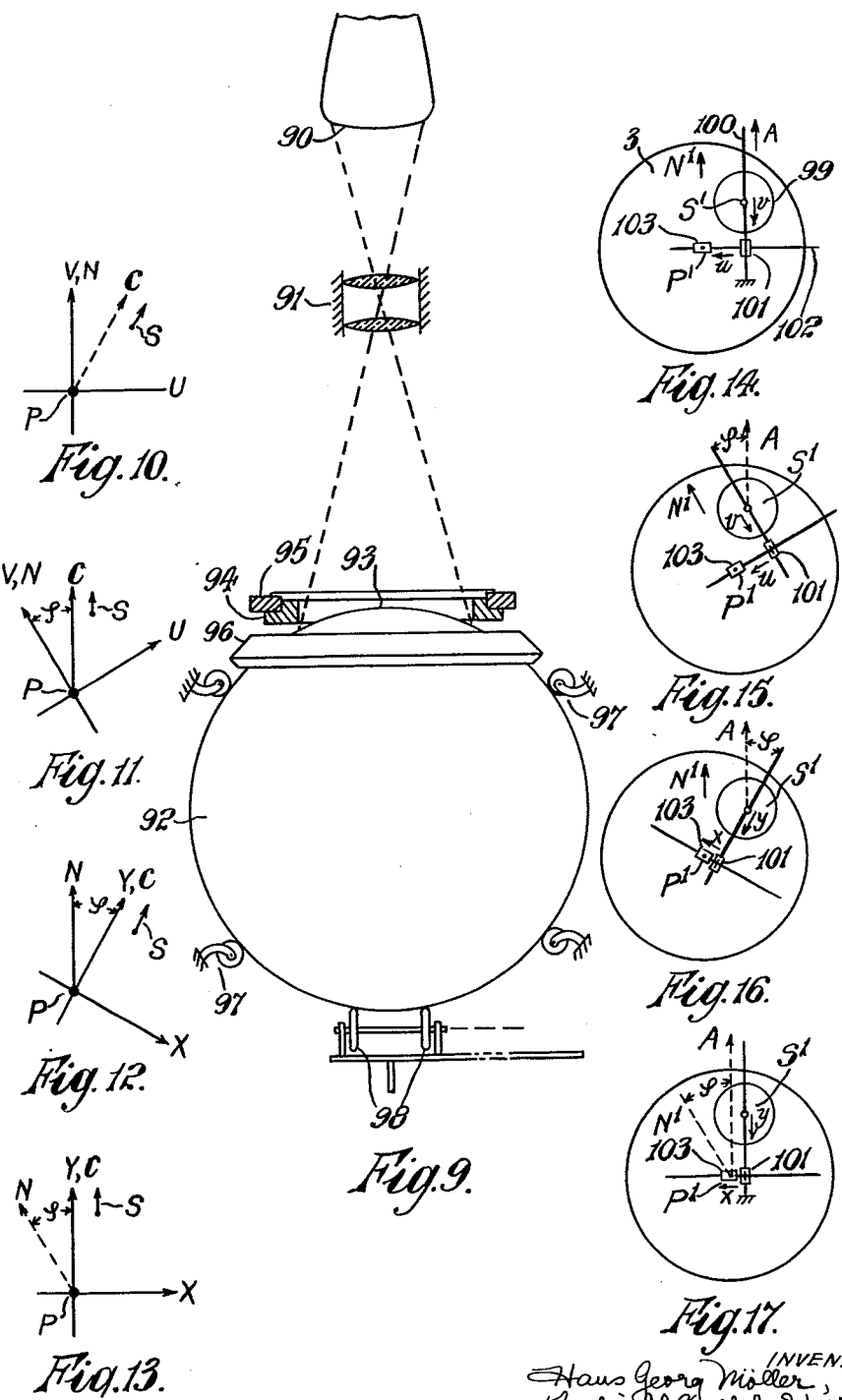

Sept. 18, 1962     H. G. MÖLLER ETAL     3,055,000
RADAR SET
Filed Nov. 16, 1956                     7 Sheets-Sheet 5
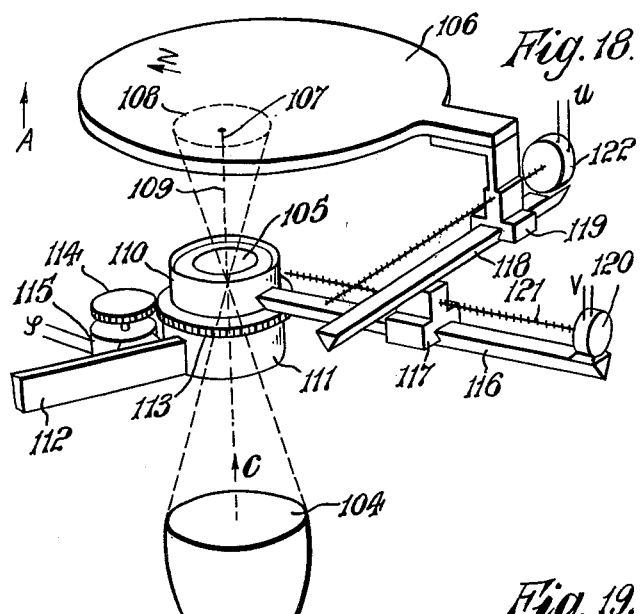
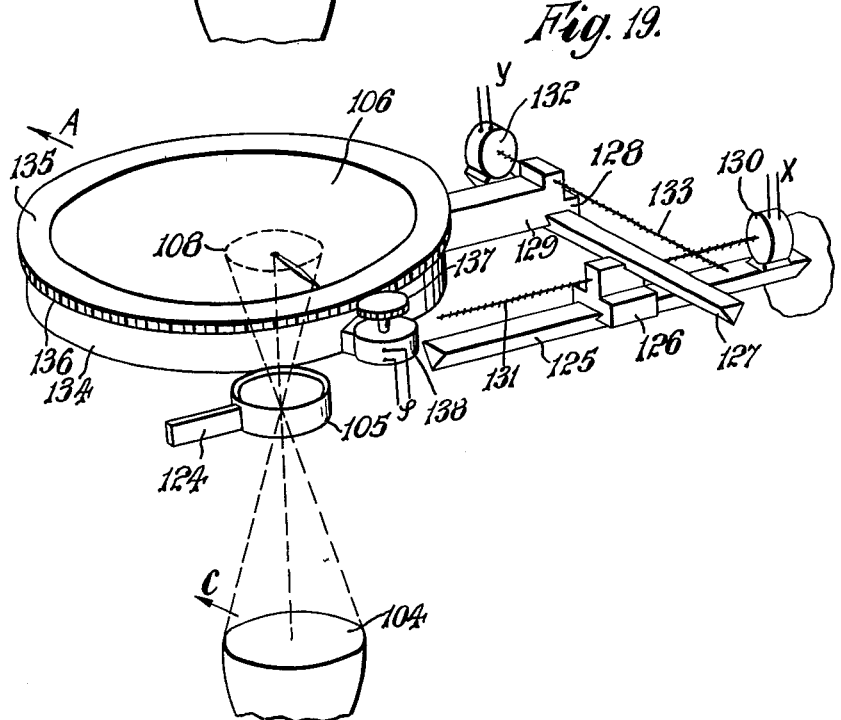
INVENTORS
Hans Georg Möller
Friedrich Wilhelm Hallmeyer
by Ezekiel Wolf their attorney

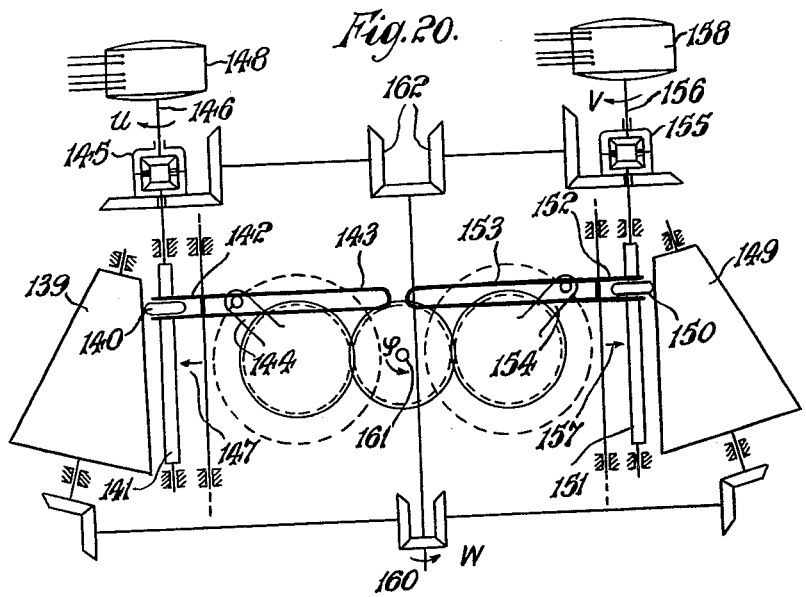
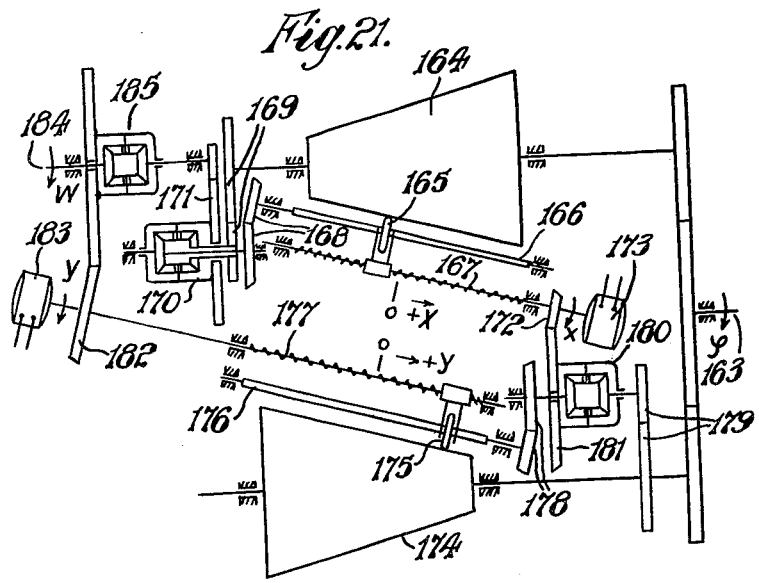

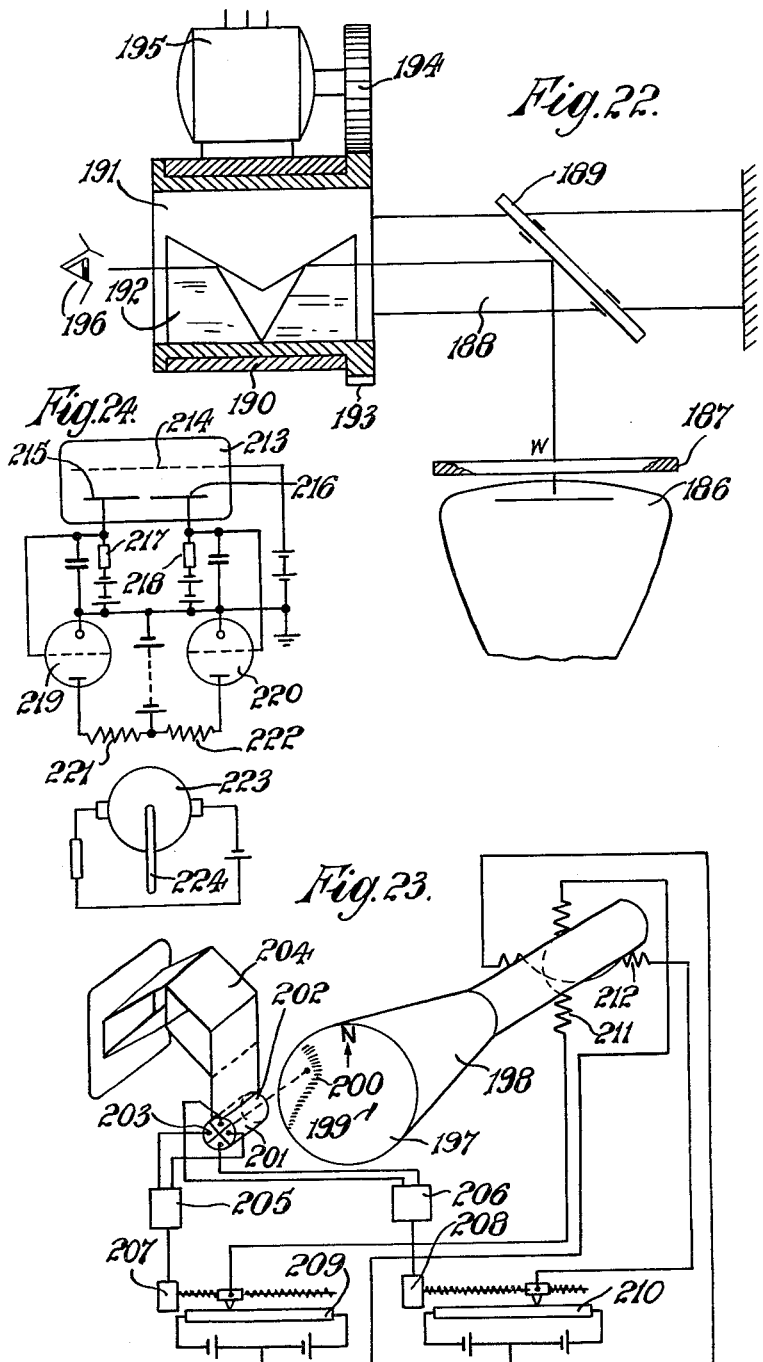

United States Patent Office 3,055,000
Patented Sept. 18, 1962

3,055,000
RADAR SET
Hans Georg Möller, Glindersweg 4, Hamburg-Bergedorf, and Friedrich Wilhelm Kallmeyer, Manteuffelstr. 38, Bremen, Germany
Filed Nov. 16, 1956, Ser. No. 622,684
Claims priority, application Germany Nov. 19, 1955
8 Claims. (Cl. 343—5)

This invention relates to arrangements in conjunction with a radar set on a ship for the purpose of recording the true course of other ships located by said radar set together with the course of the actual ship carrying the radar installation.

In the known P.P.I. display on the screen of a cathode ray tube, the observing ship is represented by the starting point of the periodic radial sweeps of the electron beam, which is generally situated in the centre of the screen. With the passage of time, the images of other ships and other targets generally change their positions on the screen, the afterglow effect of the screen or manual tracing giving paths of motion representing the relative movement of the targets in relation to the observing ship. When the latter is in motion, the paths of the images of other ships indicate neither their true course nor their true speed and the images of stationary targets move. As long as the observing ship maintains a uniform course and speed, an experienced observer is able to judge approximately the true course and the speed of other ships and recognize stationary targets as such from the picture recorded on the radar screen, but when the observing ship changes course such a performance is beyond normal faculties. Thus in actual critical situations, particularly when evasive action is being taken, the radar set gives no information regarding the course of other ships. While this information can be ascertained by transferring the radar images obtained at different times to a chart sheet, and allowing for the travel of the observing ship, such a process is tedious and time-consuming.

An object of this invention relates to arrangements in conjunction with a radar set on a ship for the entirely automatic or semi-automatic recording of the true courses of the observing ship and other ships.

An object of the invention relates furthermore to arrangements for producing a picture of the true position or movement of stationary or moving targets respectively in relation to the mass of sea water, which is assumed to be stationary, the picture being oriented either constantly with respect to the north direction or with respect to the direction of the instantaneous course of the observing ship (i.e. in the picture) and, if desired, switching arrangements being provided whereby the orientation of the picture with respect to the instantaneous course as existing at a determined point in time instant can be retained unchanged or stabilized for a succeeding period.

An object of the invention relates furthermore to the use of additional deflection coils, which are arranged in such a manner to be stationary or rotatable about the axis of the tube in accordance with the course of the observing vessel, for the additional deflection of the electron beam in the cathode ray tube of the radar set, in conjunction with an arrangement for the automatic variation of the coil currents in dependence on the speed of travel and direction of travel of the observing ship at any time, so that the starting point of the periodic radial sweeps of the beam is displaced on the afterglowing screen in accordance with the progress of the observing ship, the screen being of a kind such as to preserve or "record" visual indications produced thereon by the election beam, e.g., by afterglow.

An object of the invention is furthermore related to the use of a cathode ray tube with an afterglow or image persistence screen, which is rotated about the axis of the tube in accordance with the course of the observing ship, to indicate the true course of other ships in a picture oriented constantly to the course of the observing ship.

An object of the invention relates furthermore to the recording of a picture of the paths of motion of targets and of the path of the observing ship on a surface onto which the instantaneous screen picture of a radar set is projected and which is displaced and if desired rotated in accordance with the progress of the observing ship relatively to the image of the observing ship.

An object of the invention relates furthermore to the production of an image, oriented with respect to the course of the observing ship or constantly to the north direction, of the paths of motion of targets and of the observing ship, on a projection surface using a compound slide system disposed to be stationary, that is non-rotatable, for displacing the projection surface.

An object of the invention relates furthermore to the production of an image of paths of motion on part of the surface of a sphere which is rotated about different axes in accordance with the progress of the observing ship.

An object of the invention relates furthermore to the use of an inverting prism, rotated in accordance with the course of the observing ship at any time, for viewing an image, oriented with respect to the north direction, of paths of motion and for converting the same into an image oriented to the course of the observing ship.

An object of the invention is furthermore photoelectric control arrangements which so regulate an additional deflection of the electron beam of the picture tube of a radar set that successive images of a stationary target are always produced at the same point of the screen, use being made of a screen on which the instantaneous images persist.

Hereinafter, a direction which, to the viewer at the place provided for him, extends from bottom to top in the plane of the image surface on which the instantaneous radar images are recorded, will be referred to as "image axis A." When this axis constantly corresponds, with respect to the recorded image, to the forward direction of the observing ship, the image is referred to as "course-oriented." Deviation of the north direction in the image N' from the image axis A by an angle inversely equal to the course angle between the north direction N and the course direction C is included therein. During changes of course the picture surface with the image on it must therefore be rotated in its plane against the image axis. When the axis A constantly corresponds, with respect to the image, to the north direction, the image is referred to as "north-oriented." This is the same orientation as is used in viewing sea charts.

If an arrangement is provided which, for example, produces a north-oriented image of the paths of motion of radar targets, then it is possible in principle to obtain a course-oriented image by rotating the entire arrangement, in accordance with particular course of the observing ship, against the image axis A about an axis vertical to the picture surface. A course-oriented image can be converted into a north-oriented image in similar manner. In order to avoid unnecessary complications, however, it is generally preferable to design separate sets for each of the two kinds of image orientation.

Since ships' navigators in most cases prefer a course-oriented picture, it is a particular object of the invention to provide simple arrangements for producing such a picture. On the other hand, it may be desired, when beginning an evasive manoeuvre, to retain the orientation of the picture to the former course independently of succeeding changes of course, or, when near land, to use a north-oriented picture so that convenient comparison with the sea chart is rendered possible. Change-over arrangements can therefore be provided to change the orientation of the picture.

For a P.P.I. display of targets by means of a radar set, wave pulses are periodically emitted in varying directions. The reflected echoes returning from one direction cause the electron beam of a cathode ray tube to be modulated as to current intensity in accordance with the time of their arrival, said electron beam being moved outward, following each emission, from the centre of the screen in a radial direction corresponding to the direction of emission. On each pulse emission there is thus obtained a linear instaneous picture of the position of objects located in the instantaneous direction of emission, with the starting point for the deflections of the electron beam corresponding to the observing ship. In conventional radar sets it is known the periodic sweeps of the electron beam may be emitted in such a manner that the image axis A corresponds either to the course direction of the observing ship or to the north direction.

According to the invention, in order to obtain a picture of the true paths of motion of targets, it is necessary to put together the instantaneous picures obtained with the radar set, on a picture surface on which a definite direction is assumed as corresponding to the north direction, in the correct orientation and with starting points which are displaced in accordance with the travel of the observing ship.

The picture surface used may be the screen of the same cathode ray tube on which the instantaneous images are produced by an electronic beam. In that case, the electron beam is deflected in accordance with the progress of the observing vessel by a controlled magnetic field additionally to the periodic radial deflections. By using a screen having a long afterglow or persistence, the instantaneous images produced on the screen remain visible for a longer period. Although the afterglow trace of the instantaneous images may disappear after a few minutes, the visible portion of the path represented thereby is nevertheless generally adequate for ascertaining the course of a ship and its speed. By manual tracing the afterglow image may be preserved for a period of any desired length or a screen of special construction may be provided, which stores the indications produced by the electron beam for a longer period. A dark trace cathode ray tube may also be used for this purpose.

The recording of the picture of the true paths of motion can also be effected on the screen of an image storage tube and the picture produced thereon be made visible from the rear of the screen by television scanning. The picture produced is stable for more than an hour but, if desired, can also be immediately erased. An image storage tube of the kind indicated is described in Pérato's work, "Ensemble de Transformation d'Image Type T.I. 440," Bücherei der Funkortung, Band 5, Teil III, Strecken-, Anflug- und Landefunkortung, Münchner Fachtagung 1955, page 92.

The desired picture of the paths of motion of the targets can also be produced on a light-scattering picture surface, on which the instantaneous images appearing on the screen of the cathode ray tube—which in this case is to have only a short afterglow—are depicted by optical means. The projection screen is displaced in accordance with the progress of the observing ship relative to the spatially fixed image of said ship while maintaining the correct orientation. For the purpose of recording the instantaneous images, the projection screen is coated with an afterglow compound, transparent if desired, or any desired photochemical or photoelectric processes for fixing the optical image may be used, in which a permanent visible change of illuminated regions is brought about.

Instead of displacing the projection surface against the optical image of the radar screen as formed thereon, said image may of course be moved over the stationary projection surface, for example by means of a moving image-reproducing lens or two crossed mirrors. For a course-oriented display, the image screen is not strictly stationary as it is essential in such case to rotate the screen with changes of the course pursued.

At the beginning of the production of a picture of the paths of motion of targets, the position of the image $S'$ of the observing ship on the picture surface is so selected that the maximum distance is available for its movement over the picture surface. When, after a certain period, for example half an hour, the point $S'$ has approached the edge of the picture surface to such extent that the usable range desired for locating targets is reduced below a desired minimum, the image of the observing ship must be manually set to a new initial position and if necessary the previously recorded paths must be erased. The periodically recurring need to interrupt the recording of the paths of motion can be avoided by using a part of the surface of a sphere that may be regarded approximately as plane, instead of a plane projection screen, to record the picture. Rotations of the sphere about different axes are then used instead of displacements of the projection surface.

To render possible the recording of the path of the observing ship, the indication produced by the electron beam of the image tube in its zero position must not be completely suppressed as is the case in most radar sets. For this purpose it is sufficient momentarily to brighten the beam in the intervals between the periodic sweeps.

The invention further requires an arrangement which displaces the starting point $S'$—corresponding to the observing ship—of the linear instantaneous images in accordance with the progress of the ship in relation to the surrounding water, particularly in a reference system stationary relative to the water, relative to the picture surface, particularly in a reference system of the same kind assumed upon the same. It will be readily seen that in so doing the distance traversed by the ship or its speed respectively have to be reduced in the same ratio as corresponds to the range scale for radial distances of objects in the radar image. In any case the variable location of the ship is ascertained by integration of the speed of travel, which is measured with a log, over time, taking into account the direction of travel indicated by the compass, by means of a suitable computer, the nature of which is determined essentially by the choice of the reference system.

If the locations of the ship at the time $t$ is denoted by a vector $\bar{r}_t$ originating from a fixed point P and the initial value of this vector at the time $t=0$ is denoted by $\bar{r}_0$ and if $\bar{w}$ denotes the ship's speed as to magnitude and direction, the barred letters denoting vectors, then $$(1) \qquad \bar{r}_t = \bar{r}_0 + \int_0^t \bar{w}.dt$$

The vectorial integration can be carried out by means of a steered friction wheel. The displacement between the image point $S'$ and the picture surface is zero when S and P and correspondingly $S'$ and $P'$ are coincident. The assumed zero direction, to which the actual movement of the ship is referred, and the zero direction in the image must correspond to equal compass directions.

In effect the position of the point P on the surface of the water in relation to the ship S is determined by the choice of an initial position for $S'$ in relation to $P'$.

For practical reasons it may be necessary to refer the movement of the ships to a point $P_1$, the image $P'_1$ of which lies outside the picture surface. Then:

$$(2) \qquad \bar{r}_{1t} = -\bar{r}_a + \bar{r}_0 + \int_0^t \bar{w} dt$$

where $\bar{r}_a$ corresponds to the vectorial distance of P and $P_1$. A constant displacement, corresponding to the vector $\bar{r}_a$, has to be in this case added to the displacement of point $S'$ corresponding to vector $\bar{r}_{1t}$.

If the displacement of the point $S'$ is to be composed of two components vertical to one another, the movement of the ship may be referred to right-angled system of axes, the origin of which is situated at P, with the axes designated U and V, the V-axis corresponding to the north direction. The coordinates of the location of the ship at the time $t$ are then:

$$(3) \quad u_t = u_0 + \int_0^t \sin \phi . w dt$$

$$v_t = v_0 + \int_0^t \cos \phi . w dt$$

where $\phi$ is the course angle.

It may occasionally be advantageous to use a right-angled system of axes with the axes designated X and Y, the Y-axis of which constantly corresponds to the course direction. The coordinates of the location of the ship are then:

$$(4) \quad x = x_0 - \int_0^t y d\phi \text{ and,}$$

$$y = y_0 + \int_0^t x d\phi + \int_0^t w . dt$$

where $w$, $\phi$, $x$ and $y$ are functions of the time $t$.

As will be seen, in this case the two integrations have to be performed in mutual dependence on one another and that the values of the location coordinates change with each change of the course.

When use is made of right-angled coordinates, there is greater freedom in the design of the computers for carrying out the integrations than in the case of vectorial integration. The choice of a course-oriented or north-oriented system of axes is independent of whether a course-oriented or north-oriented picture of the paths of motion is to be produced, and is governed only by the simplicity with which it can be put into effect.

While in the case of a north-oriented picture the picture surface is displaced only parallel to itself, in the case of a course-oriented picture it is rotated relative to the image axis with each change of course. By appropriate adjustment and automatic control of the orientation of the system producing the periodic deflection of the beam of the radar tube, it is to be ensured that the orientation of the linear instantaneous picture with respect to the north direction in the picture surface always corresponds to the instantaneous direction of transmission, likewise referred to the north direction.

In producing course-oriented pictures of paths of motion it is necessary during changes of course to rotate the picture surface about a point of the picture surface corresponding to the instantaneous position of the initial point of the instantaneous pictures. Wherever this is not possible in some of the exemplified embodiments described hereinafter, owing to mechanical reasons, the picture surface is rotated about one of its points which is chosen as a center of rotation, for example its centre point, and a parallel movement of the surface is obtained, in which the chosen centre of rotation is moved in a circular path around the initial point as a center. In kinematic conversion, instead of the last movement, a displacement of the initial point of the instantaneous pictures over a circle about the centre of rotation of the picture surface may be provided.

In order that the invention may be more readily understood, reference is made to the accompanying drawings which illustrate diagrammatically and by way of example several embodiments thereof and in which:

FIGURE 1 shows an arrangement for recording a course-oriented picture of the paths of motion of radar targets on the screen of a cathode ray tube with vectorial integration of the course of the observing ship and corresponding vectorial displacement of the initial point of the periodic deflections of the electron beam.

FIGURE 2 shows an arrangement for recording pictures of the paths of motion of radar targets on the screen of a cathode ray tube with vectorial integration of the progress of the observing ship and displacement of the initial point of the periodic deflections of the electron beam in accordance with two course vector components vertical to one another and with control arrangements for changing the orientation of the recorded picture, particularly when used for recording a north-oriented picture.

FIGURE 4 shows an arrangement, used in the arrangement shown in FIGURE 2, for driving and controlling a pair of friction wheels used in the course integration.

FIGURE 5 shows the winding characteristic of potentiometers used in the arrangement shown in FIGURE 2, for feeding deflection coils for the electron beam.

FIGURE 6 shows an arrangement for displacing a projection surface on which the instantaneous images of a radar set are projected for plotting purposes, in accordance with the course of the observing ship, in plan view and diagrammatically.

FIGURE 7 is a plan view of an arrangement for driving and controlling friction wheels, which effect the displacement of the projection surface in FIGURE 6.

FIGURE 8 is a partial front elevation of the arrangement shown in FIGURE 7.

FIGURE 9 shows a sphere, which is displaced by friction wheels in accordance with the progress of the observing ship, and on which instantaneous pictures of a radar set are projected for plotting purposes.

FIGURES 10 to 13 show right-angled systems of axes with different orientations in different positions for representation of the progress of the observing ship by two coordinates.

FIGURES 14 to 17 are diagrammatic representations of cross slide arrangements for displacing a projection surface onto which instantaneous pictures of a radar set are projected for plotting purposes, in accordance with the progress of the observing ship, in accordance with the systems of axes shown in FIGURES 10 to 13.

FIGURE 18 shows a cross slide arrangement for displacing a projection surface according to the diagrammatic representation of FIGURE 15 in a perspective view.

FIGURE 19 shows an arrangement for displacing a projection surface in accordance with the progress of the observing ship, according to the diagrammatic representation of FIGURE 17, in a perspective view.

FIGURE 20 shows a calculator for integration of the components of the course of the observing ship with respect to a north-oriented system of axes.

FIGURE 21 shows a calculator for calculating the variable coordinates reproducing the progress of the observing ship, using a course-oriented system of axes.

FIGURE 22 shows a device with an inversion prism, rotated on changes of course, for converting a north-oriented picture of paths of motion into a course-oriented one.

FIGURE 23 shows an arrangement for recording a picture of the paths of moving objects and the position of stationary objects on the screen of a radar set, using a photoelectric cell arrangement for the control of a displacement of the initial point of the periodic beam deflections, in accordance with the progress of the observing ship.

FIGURE 24 is a circuit diagram of the control arrangement with the photoelectric cells.

Figure 1:
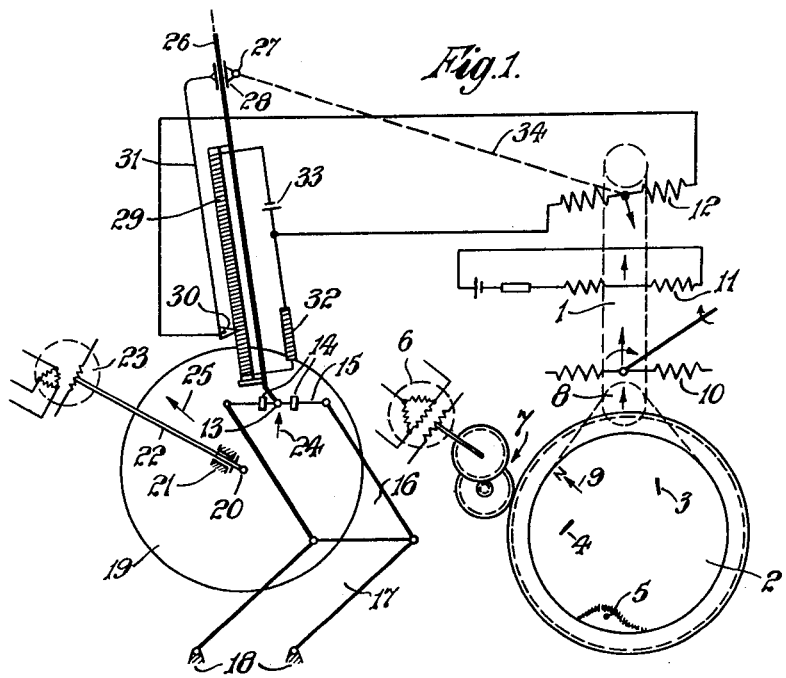

An arrangement for producing a course-oriented picture of the paths of motion of radar targets and of the observing ship on the screen of the cathode ray tube of a radar set with an analog computor for the vectorial integration of the ship's course, is illustrated in FIGURE 1. The movement of the ship is simulated on a reduced scale and in a course-oriented representation by the travel of the point 13 on a disc 19 and the electron beam of the cathode ray tube 1 is additionally deflected in accordance with the position of the point 13 in relation to the centre point 20 of the disc 19. On the screen 2 of the cathode ray tube the observing ship appears at 3, another ship at 4, and a landmark 5. The true courses of the ships are recognisable from the afterglow sweeps, while the image of the landmark undergoes no change. By means of a servomotor 6, which is connected to the compass installation, and through a toothed-wheel gear 7, the cathode ray tube 1 and hence the screen 2 are rotated about the axis of the tube against the changes of course of the observing ship. The arrow 9 denoting the north direction of the screen, and the fixed arrow 8 denoting the course direction, thus constantly enclose an angle equal to the course angle, and the direction of the afterglow path of the observing ship at the point 2 is always equal to the direction of the arrow 8. The pair of coils 10, rotated in accordance with the beam direction of the antenna, produces the normal periodic deflection of the electron beam. The position of the coils as illustrated corresponds to a forward beam direction. The pairs of coils 11 and 12 produce an additional deflection—corresponding to the progress of the observing ship—of the initial point of the periodic beam deflections 2, which corresponds to the image of the observing ship. The directions of deflection of the coils are denoted by arrows.

Displacement of the regulating members for the additional deflection is effected by a pair of friction wheels 14, which lie resiliently against the disc 19 and roll on the latter. The mounting and drive of the friction wheels can be seen from FIGURE 4. The friction wheels denoted by reference 61 in that figure are mounted in a stirrup 70 and are driven by a servomotor 71, which is connected to a log, proportionally to the speed of travel of the ship. The drive is effected through a shaft 62 and a differential gear 72, which permits any desired rotation of the friction wheel system about the point 13 relative to the disc 19 (of FIGURE 1). Unlike the illustration in FIGURE 4, the stirrup 70 is rigidly connected to a rod 15, which is parallel to the shaft and which is kept constantly in parallel relationship to itself by two articulated parallelograms 16 and 17, which are rotatably mounted at 18. The same applies to the shaft 62 of the friction wheels 14, so that when the ship moves straight ahead the point 13 of the rod 15 moves in the direction of the arrow 24. The disc 19 is carried by a shaft 22, which is disposed vertically thereto, is not shown in the correct position for reasons associated with drawing, and is mounted at 21, and by means of said shaft on changes of course is displaced, by a servomotor 23 driven from the compass installation, through an angle opposed to the change in such manner that the arrow 24 constantly indicates the course direction with respect to an arrow 25 rotating with the disc and corresponding to the north direction. At the point 13 a rod 26 is articulated on the rod 15 and slides in a sliding sleeve 28 rotatable about the point 27. Connected to the rod is a potentiometer 29, the sliding contact 30 of which is carried by an arm 31 mounted on the sliding sleeve 28. The potentiometer 29 is fed from a source of voltage 33 through a resistance 32 having a determined relationship to the potentiometer resistance. The potentiometer delivers a current, proportional to the distance between the points 27 and 13, to a rotatable pair of deflection coils 12, which is connected by a shaft 34 to the sleeve 28. The direction of deflection of the coils 12 as indicated by an arrow, and the direction of the arrow 8 together enclose always the same angle as a vector joining the points 27 and 13 and having the direction of the arrow 24, and the magnitude of the deflection corresponds to the length of this vector. The fixed deflection coils 11 fed by a constant current produce a deflection of the electron beam in the direction of the arrow 8, the magnitude of which deflection corresponds to the length of a vector which joins the points 20 and 27 and which is parallel to the arrow 24. The deflections produced by the two pairs of deflection coils 11 and 12 combine to form a resultant deflection, which corresponds as to magnitude and direction to the vector joining the points 20 and 13. Composition of the deflection vector from two vector components in the manner indicated is necessary to avoid the occurrence of a mechanical dead point in the gear effecting the potentiometer adjustment.

In order that the current applied to the deflection coils 12 may vary proportionally to the displacement of the potentiometer tapping 30, the resistance of the potentiometer would have to be small in relation to that of the deflection coils, if use were made of a potentiometer having a uniform winding. However, in respect of the capacity of the potentiometer, it is more advantageous to make the two resistances equal in respect of magnitude. The potentiometer then has to be made with a non-uniform winding, for example by using a winding support of size variable in the longitudinal direction.

Let the distance of the sliding contact from its lowermost position on the potentiometer 29 be $s$, the simultaneous distance between the points 13 and 27 $s+s_0$, the value of the resistance 32 $R_0$, this resistance together with the resistance of the potentiometer 29 R, and the resistance of the deflection coils 12 $r$, then: with $$x = \frac{s+s_0}{s_0}$$

the resistance of the potentiometer in dependence on $x$ is:

$$R(x) = -R_0 + 1/2 \cdot \left( \frac{R_0 - R - r\frac{R}{R_0}}{x} + R \right) + \frac{1}{4}\sqrt{\left(R_0 - R - r\frac{R}{R_0} + R\right)^2 + rR}$$

With an assumed value of $$\frac{R}{r}$$

the potentiometer 29 can be given a suitable length by the choice of $$\frac{R}{R_0}$$

Figure 3:
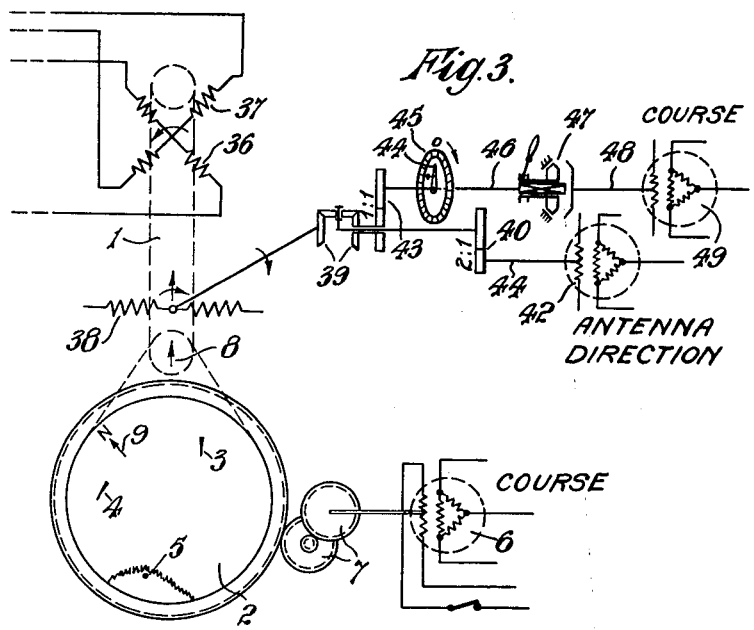
FIGURE 3 shows the same arrangement used for recording a course-oriented picture.

An arrangement whereby as desired a north-oriented or a course-oriented picture of the paths of motion can be recorded on the screen of a cathode ray tube and in which the additional deflection field for the electron beam is composed of components parallel to the axes of a north-oriented right-angled system of axes, is shown in FIGURE 2. While FIGURE 2 illustrates the arrangement when used to produce a north-oriented picture, the partial elevation in FIGURE 3 shows the use to produce a course-oriented picture.

A servomotor 6 adapted to be switched off, connected to the compass installation, and acting through the gear 7, enables the cathode ray tube 1 with the screen 2 to be rotated about the axis of the tube against the course of the ship. Two crossed coils 36, 37 to produce the additional deflection are rigidly joined to the cathode ray tube 1 and rotate with the latter. The pair of coils 38 for production of the normal periodic deflection of the beam are rotated in accordance with the beam direction of the antenna by rotation of the shaft 41 by means of a servomotor 42 through a differential gear and a toothed-wheel gear 40, and can also be rotated in accordance with the course of the ship through a gear 43, the shafts 46 and 48, and a coupling 47 joining the latter, by a servomotor 49, the pointer 44 on the shaft 45 indicating the rotary angle corresponding to the course on a scale 45. When the connection between the shafts 46 and 48 is broken, the shaft 46 can be held fast by the coupling 47. The arrow 35 in FIGURE 2 denotes the direction on the screen corresponding to the instantaneous course.

The arrangement for the course integration works with similar means to that shown in FIGURE 1. The pairs of coils 36, 37 are fed with variable currents by the potentiometers 50, 51, to displace the starting point of the periodic beam deflections 3 in the west-east and south-north directions of the screen. The two potentiometers, which are fed from voltage sources with a centre tapping, are disposed parallel to two guide rods vertical to one another and are connected to the latter at the ends. Sliding sleeves 54, 55, which are slidable on the guide rods and carry the sliding contacts 56, 57, connect the guides together and, through an arm 58, to a disc 59, so that this disc, corresponding to the screen 2, can be displaced as desired parallel to itself in relation to the support 60. At the same time, the sliding contacts 56, 57 are displaced so that the coils 36, 37 are fed with currents which are proportional to the deviations of the disc from its centre position. Displacement of the disc 59 is effected by a pair of friction wheels 61, which have an axis 62 parallel to the disc and which lie against the disc with some pressure and are driven proportionally to the speed of travel through a differential gear 72 (cp. FIGURE 4). The shaft 62 is mounted in a stirrup 70 at the end of a shaft 65 vertical to the disc 59. A motor 71 connected to a log drives the friction wheels 61 through the shaft 62 and the differential gear 72 proportionally to the speed of travel. The shaft 65 disposed centrally in relation to the friction wheels is rotatably mounted at 64 and is driven by a servomotor 66 connected to the compass installation. The pair of wheels 61 is thus so rotated about the fixed point 63 that the direction denoted by the arrow 67, in which the wheels would move if they were freely movable, always forms an angle corresponding to the instantaneous course of the observing ship with the arrow 68, parallel to the guide 53, on the disc 59. The position of the wheel centre 63 in relation to the centre 69 of the disc 59 driven by the wheels constantly determines the position of the image 3 of the observing ship, through the additional beam deflection controlled by the potentiometers 50, 51.

The use of two friction wheels connected through a differential, instead of a single friction wheel, has the advantage that even on rotation about the shaft 65 in consequence of changes of course good adhesion of the wheels 61 on the disc 59 is secured. If, for example, the ship immediately turns, the wheel shaft 62 is rotated about the point 63, while one of the two wheels 61 advances to the same extent as the other moves back and the point 63 of the disc 59 is held fast. In consequence, the image 3 also remains at the same point on the screen 2.

As with the potentiometer 29 in FIGURE 1, the potentiometers 50 and 51 also have a non-uniform winding. Let the resistance of a potentiometer be 2R, that of the deflection coils fed by it be $r$, the length of a potentiometer be $l$, the distance of the sliding contact from the centre of the potentiometer $s$, then with $$x = \frac{2s}{l}$$

for a coil current variable proportionally to $s$ the resistance between the potentiometer centre and the sliding contact is:

$$R(x) = -\frac{r}{x} + \sqrt{\left(\frac{r}{x}\right)^2 + R(R+2r)}$$

and the resistance, referred to the unit of length, in comparison with a potentiometer having a uniform winding and the same total resistance is:

$$\frac{1}{R}\frac{dR(x)}{dx} = \frac{r}{R}\frac{\alpha}{1+\alpha x^2 + \sqrt{1+\alpha x^2}}$$

where $$\alpha = \frac{R(R+2r)}{r^2}$$

The curve of this function is illustrated in FIGURE 5.

When the arrangement described is used to produce a north-oriented picture, the tube 1 together with the deflection coils 36, 37 is so rotated when the servomotor 6 is switched off that the arrow 9 denoting the north direction has the position shown in FIGURE 2, that is to say corresponds to the image axis. After the pointer 44 is adjusted to the instantaneous course, the servomotor 49 is engaged by means of the coupling 47 and the installation is ready for operation.

When used to produce a course-oriented picture as shown in FIGURE 3, the servomotor 49 is decoupled and the pointer 44 set to zero by rotating the shaft 46 and is held in this position. The cathode ray tube 1 is thereupon so rotated that the arrow 9 and the image axis 8 enclose an angle inversely equal to the course angle, and the servomotor 6 is switched in.

In order to retain the instantaneous orientation of the picture to the course direction for a successive period, the servomotor 49, which remains constantly in operation, is coupled with the shaft 46 and the servomotor 6 disengaged.

If the radar picture covers fixed targets on land, it may be desirable to allow for any water flow, by referring the motion of the observing ship, not to a reference system stationary in relation to the water mass in which the ship moves, but to one stationary in relation to the fixed land. In the case of FIGURE 2, this means that the support 60 must be displaced in the direction of the flow, referred to the direction of the arrow 68 as north direction, and with a speed reduced to scale. On the open sea, such an arrangement is superfluous, since all ships are floating in the same flow.

An arrangement for displacing a picture surface, onto which the screen picture of a normal radar set is projected by a lens system, in accordance with the progress of the observing ship, is shown in FIGURE 6. The disc 73 serving as picture surface is coated with an afterglow compound. At the top, it is supported by universally movable rollers 74, which permit displacements in any desired directions, and is driven by a pair of friction wheels 75, which are pressed resiliently against its rear and the shaft of which is denoted by reference 76. The centre 77, which is in every case stationary, of the shaft 76 coincides with the spatially fixed initial point of the instantaneous pictures projected on the disc 73.

The arrangement serving to drive and to control the two friction wheels is illustrated in FIGURES 7 and 8. The mount for the friction wheels and their driving means are disposed on a plate 79, which is in turn carried by a shaft 81 passing through the point 77 and vertical to the disc 73. Said shaft, which is rotatably mounted at 80, can by means of a coupling 82 either be secured in a determined position or be coupled to a servomotor 83 connected to the compass installation. The position of the plate 79 or of the shaft 77 of the friction wheels is indicated on a fixed scale by a pointer 84. A servomotor 85, through a differential gear 86, drives the friction wheels in the same direction in accordance with the speed of travel of the ship and displaces the disc 73 in a direction vertical to the direction of the shaft 77 at any time. A second servomotor 87 drives the friction wheels in opposite directions on changes of course, through a second differential gear 89 and an additional gear 88, in such manner that on turning of the ship there and then the disc 73 is rotated about the point 77 against the change of course through the same angle.

In producing a course-oriented picture of paths of motion the shaft 81 is held fast by the coupling 82 in a position such that the pointer 84 is on zero. On straight ahead travel of the ship the disc 73 is then displaced parallel in the direction of the arrow 78. On changes of course the motor 87 produces a rotation of the disc about the point 77 against the change of course, so that the course direction on the picture surface always corresponds with the image axis. The linear instantaneous pictures projected onto the disc 73 and originating from the point 77 must be constantly course-oriented.

In producing a north-oriented picture the instantaneous pictures must also be constantly north-oriented. After the pointer 84 is set to the angle corresponding to the instantaneous course, the motor 83 is connected to the shaft 81 by operation of the coupling 82, so that on changes of course the shaft 76 of the friction wheels is displaced through the same angle. Through the cooperation of this rotation with the reciprocal turning of the friction wheels produced simultaneously by the motor 87, no rotation of the disc 73 occurs, so that the north direction on the picture surface remains coincident with the image axis. In order to pass from the production of a course-oriented picture to a picture which is constantly oriented to the instantaneous course as a cardinal point, it is sufficient to contact the motor 83 with the shaft 81 by operating the coupling 82. At the same time, as described for the arrangement shown in FIGURES 2 and 3, the arrangement for the periodic radial deflections of the electron beam is to be so adjusted that the instantaneous images are correctly oriented in relation to the image axis, which now corresponds to a determined cardinal point.

The drive of the friction wheels by the motor 85 is so dimensioned that the displacement of the disc 73 is reduced in size in accordance with the range scale of the instantaneous images in relation to the true speed of travel of the ship.

While retaining the drive system shown in FIGURE 7 it is possible, as illustrated in FIGURE 9, to replace the plane projection surface shown in FIGURE 6 by a sphere and use an approximately plane part of the same as a projection surface. The diameter of the sphere is made so large in relation to the image-reproduction scale that the surface of a spherical segment corresponding to the desired range can be used as a plane surface without substantial picture errors occurring. The centre of the image surface, which is circularly bounded by a fixed frame, always corresponds to the initial point of the instantaneous images recorded on the sphere or to the location of the observing ship. By rotation of the sphere about axes passing through its centre, the recording surface is displaced in accordance with the speed and direction of travel in relation to the instantaneous images, which are oriented either to the course of the ship or to the north direction, in such manner that the change of the instantaneous images—produced by the progress of the observing ship—of stationary objects in the reference system adopted is precisely equalized and the images of such objects do change their positions in the picture frame but not on the surface of the sphere. A hollow sphere made of transparent material and coated with an afterglow colour on the inside may be provided, for example, to record the instantaneous images projected on the surface of the sphere.

FIGURE 9 shows at 90 the screen of a cathode ray tube forming part of a radar set on board a moving ship. On the screen are produced instantaneous pictures of the surroundings, which are oriented either to the instantaneous course or to a cardinal point, that is to say in which these directions are fixed for a viewer. The duration of the afterglow of the screen 90 is short, so that when moving objects are depicted no disturbing afterglow sweeps occur on the screen. By means of a lens system 91 the screen picture is so projected onto a sphere 92 that the image of the initial point of the instantaneous images, which initial point corresponds to the location of the observing ship, appears in the centre 93 of the part of the surface of the sphere 92 that is bounded by a circular mask 94. The diameter of the circular surface enclosed by the mask is equal to or greater than the diameter of the screen picture projected onto the sphere. The periphery of the sphere is at least eight times larger than the diameter of the mask. On the mask ring 94 is disposed a bearing plate 95 with a locating mark, the zero direction of which on production of a north-oriented picture is held by a compass motor constantly in conformity with the course of the observing ship in the picture of the paths of motion. By afterglow effect, the instantaneous images projected onto the sphere still remain visible for a longer period at the points where the sphere was illuminated, even on rotation of the sphere about its centre. Concentric with the mask 94 is disposed an annular infra-red emitter 96 to erase older recordings. The sphere 92 is mounted between universally movable rollers 97, so-called trailing rollers, so as to be rotatable in any desired direction about its centre. Drive of the sphere is effected by means of a friction wheel arrangement, 98, which is resiliently pressed into contact and which corresponds to that shown in FIGURES 7 and 8. This arrangement is operated similarly to the drive for a plane projection surface according to FIGURE 6, except that the rotation of the wheels 75 corresponding to the speed of travel is effected in the reverse sense. The point 93, the centre of the sphere, and the shaft centre of the two friction wheels lie on a straight line, about which the driving system 98 is rotatable as axis in producing a north-oriented picture, while on production of a course-oriented picture said driving system is stationary.

In similar manner to that described for the arrangement illustrated in FIGURE 6, in this case too production of a north-oriented or a course-oriented picture as freely chosen or orientation of the picture to the instantaneous course as a cardinal point may be provided.

Inside the sphere may be provided electronic means for amplifying the projecting instantaneous images or the afterglow images, and these means may be fed through a plurality of induction coils, having different orientations and operated at different frequencies, from outside without breaking through the wall of the sphere.

In order to reduce the space required for the arrangement, the sphere and the picture projected thereon may be made relatively small and the picture viewed through a television set. In this way, the picture can be enlarged and at the same time its brilliance be increased. The sphere, constructed as a light storage means, may also form part of a television unit and be directly scanned electronically.

A substantially edgeless recording surface can also be produced by passing a long flexible recording strip, the ends of which are wound on reels, around a cylinder with its longitudinal directions parallel to the axis of said cylinder, in such manner that the lateral edges of the strip abut against one another. A circular part of the cylindrically folded strip is used as recording surface, the diameter of the cylinder being chosen to be so large that this part may be regarded as being approximately plane. The recording strip can be rotated with the cylinder about the axis of the latter and in addition be displaced cylindrically in the direction of the axis, from which two movements a displacement of the recording surface in any desired direction can be composed. On rotation of the strip about the axis of the cylinder, the reels on which the ends of the strip are wound are co-rotated about said axis. To produce course-oriented pictures of paths of motion, the entire arrangement must in addition also be rotatable in accordance with the changes of course about an axis vertical to the recording surface. The speeds at which the recording surface is to be rotated in itself and be displaced in the longitudinal direction are ascertained for every speed and direction of travel by a calculating gear.

In the apparatuses described hereinbefore, the path of the observing ship is ascertained by vectorial integration in accordance with Equation 1 or Equation 2 using controlled friction wheels. When, as in the arrangement shown in FIGURE 2, the relative displacement—serving for the progress of the ship—of the initial point of the instantaneous images in relation to the picture face is composed of displacements in two directions vertical to one another, it is more advantageous to ascertain the same directly by scalar integration in accordance with Equations 3 and 4, instead of by splitting up the result of the vectorial integration into the corresponding components. In so doing, the motion of the ship can be referred to a north-oriented right-angled system of axes (U-V-system) as in FIGURES 10 and 11, or to a course-oriented system (X-Y-system), as illustrated in FIGURES 12 and 13. As zero point of the system of axes, a stationary point P in a suitable position is chosen, which point is changed from time to time when the paths of motion to be recorded pass beyond the edge of the picture surface. S denotes the location of the ship, the direction of motion of which is indicated by an arrow. The course direction parallel thereto is denoted by C, the north direction by N and the angle between the two by $\phi$. FIGURES 10 and 13 show reference system and ship in a north-oriented position, FIGURES 11 and 13 in a course-oriented position.

FIGURES 14 to 17 diagrammatically illustrate the tracing of the motion of the ship S on the surface of the sea by the movement of a point S' on a projection surface 99 with cross slide arrangements corresponding respectively to the systems of axes shown in FIGURES 10 to 13. With reversal of the actual movement the projection screen 99 is displaced against the fixed point S', which is the initial point of the instantaneous images of a radar set as projected onto the surface 99 and which thus also forms the location of the observing ship. The circle about S' as centre encloses the range covered by the radar set. In the figures, the rectilinear guide 100 corresponds to the axis V or Y, the displacement of a slide 101 sliding thereon from its centre position corresponds to the ordinate values $v$ or $y$, the second guide 102 carried by the slide 101 and at right-angles to the first slide corresponds to the axis U or X, and the displacement of a slide 103 sliding on said guide, from its centre position, corresponds to values $u$ or $x$. The slide 103 carries the disc 99 serving as recording surface, which is rigidly connected to it when a north-oriented system (FIGURES 14, 15) is used or which is rotatable about the point P' when a course-oriented system of axes (FIGURES 16 and 17) is used. The point P', which is advantageously placed in the centre of the disc 99, corresponds to the reference point P and must therefore come to coincide with the point S' when the coordinate values are zero. Reference A denotes the image axis (already explained) and N' the north direction on the picture surface.

The construction of an arrangement corresponding to that illustrated diagrammatically in FIGURE 15, for moving a projection surface by means of a rotatable cross slide arrangement, is shown in FIGURE 18. On the screen 104 of a cathode ray tube forming part of a radar set on a ship, course-oriented instantaneous images of the surroundings are constantly produced and are projected by means of a lens system 105 onto a projection surface 106 of transparent material provided with an afterglow compound. The point 107 is the initial point of all the linear radial instantaneous images projected onto the surface 106 and all said images lie within the circle 108. From the point 107, representing the location of the observing ship, an afterglow trace produced by the prior travel of the ship moves rearward and always extends parallel, at least in its most recently formed portion part, to the image axis A. Displacement of the projection surface in accordance with the speed and direction of travel of the observing ship is effected by a cross slide arrangement, which is rotatable about the optical axis 109 and to this end is fastened on a ring or a hollow shaft 110, which is mounted rotatably in a ring 111 carried by a fixed arm 112 and concentric with the optical axis 109. The ring 110 has an external toothed rim 113, which meshes with a gearwheel 114 mounted on the shaft of a servomotor connected to the compass installation. Said motor 115 rotates the ring 110 and hence the cross slide arrangement 116 to 119 and the projection surface 106 in accordance with the particular course angle, as will be seen from FIGURE 15. The cross slide arrangement comprises a guide 116, which is mounted in the radial direction on the ring 110, with a slide 117, which carries a second guide 118 and slide 119, at right-angles to the first, said slide 119 being connected to the projection surface 106. Displacement of the slides is effected by screw spindles 121 and 123 respectively by means of the servomotors 120 and 122 respectively in accordance with the coordinate values $v$ and $u$, which are ascertained from the ship's speed and course, for example by means of the mechanical integration device shown in FIGURE 20.

The ring 111 or 110 in the construction illustrated is at the same time the support for the lens system 105, but the latter may be mounted independently of the rings. An essential feature is the construction of the rotary shaft of the cross slide system as a hollow shaft through which the projection is effected. As a result, and by suitable arrangement of the guides 116 and 118, no part of the movement mechanism ever passes into the region of the projected rays. In consequence of the fact that projection and observation take place from different sides, the top area of the projection surface 106 is freely accessible, for example for notations by hand or for the provision of an auxiliary unit serving to store or convert the picture. The surface 106 can also be constructed as a photo-cathode of a television pick-up unit moved in the same way as the projection surface, in which case a storage effect of the maximum possible duration will be aimed at.

For the automatic recording of the instantaneous images projected onto the projection surface 106, use may be made not only of the afterglow effect but also of the emission of photoelectrons at the surface of the area 106, which is to this end metallised transparently and if desired mosaic-fashion. This can be effected for example by precipitation of a negatively charged aerosol at the points of the surface 106 that are charged up by the emission of electrons.

The emitted photoelectrons themselves can also be used for the production of a lasting picture which is, however, readily eliminated at any time by wiping it off, by depositing a pigment on the projection surface after the style of the known photoelectric printing process.

Lasting general views can also be produced by arranging either the varying instantaneous picture or a general picture afterglowing for a short period to be constantly scanned photoelectrically and recorded by means of an appropriately moved stylus in similar manner to that known for facsimile apparatus, the recording surface and device being displaced relative to one another in the same way as the instantaneous picture and the projection surface.

Each time the instantaneous picture moves beyond the width of the projection surface, the latter must be returned, this being the case at intervals of 20 minutes to about two hours, depending upon the picture scale selected and on the speed of travel of the observing ship. After return of the screen, some time elapses until the new general picture has built up to such extent that the course of the observing ship and the courses of other ships are recognisable. During this period, in addition to the new general picture, the old general picture, which is displaced only in parallel relationship to the new one, can be used for observation purposes.

In order to enable a collision course to be determined more readily, a bearing ring with a location mark corresponding to a diameter can be provided above the projection surface 106 and concentric with the point 107.

The apparatus shown in FIGURE 19 also serves to produce a course-oriented picture of paths of motion but in accordance with the diagrammatic illustration in FIGURE 17 uses a fixed cross slide system, which has the advantage that the same can be so disposed that it does not obstruct the viewer. The remarks in connection with FIGURE 18 apply to items 104 to 108. The lens system 105 is held by an arm 124. The cross slide arrangement comprises a fixed guide 125 with a slide 126, which carries a second guide 127 at right angles to the first, said second guide 127 sliding on a slide 128. On an arm 129 the slide 128 carries a ring 134, in which a second ring 135 is rotatable with the projection surface 106 and is rotated in accordance with the course direction at any time by means of a tooth rim 136 and a gear wheel 137 driven by a servomotor 138 connected to the compass installation. Displacement of the slides 126 and 128 is effected by screw spindles 131, 133 and servomotors 130, 132 in accordance with the coordinate values $x$ and $y$, which can be ascertained from the ship's speed and the course, for example by an integration means as shown in FIGURE 21.

A calculator for calculating the coordinates of the ship's position in a north-oriented system of axes $$u = \int \sin \phi . w . dt$$

and $$v = \int \cos \phi . w . dt$$

is illustrated in FIGURE 20. A conical roller 139 (149) is driven proportionally to the speed of travel $w$ from a log through the shaft 160 and in turn drives a friction wheel 140 (150), slidable on a square shaft 141 (151) by means of a fork 142 (152), at a speed of rotation dependent upon the position of the fork 142 (152). To the speed of rotation of the shaft 141 (151), which is in varying relationship to the speed of travel $w$, there is added through a gear 162 and a differential gear 145 (155) a rotation in fixed relationship to the speed of travel, in such manner that the shaft 146 (156) stands still when the friction wheel 140 (150) is located in the central position marked by the arrow 147 (157). Displacement of the friction wheel 140 (150) is effected by means a crank guide 143, 144 (153, 154), which is displaced by a shaft 161 according to the course angle. Displacement of the friction wheel 140 from its centre position 147 and hence the speed of rotation of the shaft 146 at a determined speed of travel $w$ is proportional to $\sin \phi$ and, in accordance with the displacement of the friction wheel 150 and the speed of rotation of the shaft 156 proportional to $\cos \phi$. The rotations of the shafts 146 and 156 corresponding to the integral values $u$ and $v$ are transmitted by adjustment generators 148 and 158 to the servomotors of, for example, a cross slide arrangement as shown in FIGURE 18, it being possible to add any desired initial adjustments $u_0$ and $v_0$. In the apparatus shown in FIGURE 18, for the return of the projection surface as is necessary from time to time, the nuts encircling the screw spindles in the slides are advantageously adapted to be swung open for the purpose of disengaging the slides for adjustment of the screw spindles.

A calculator for calculating the coordinates of the ship in a course-oriented system of axes $$x = x_0 - \int y . d\phi$$
$$y = y_0 + \int x . d\phi + wdt$$

is illustrated in FIGURE 21. This apparatus contains variable friction wheel gears like that shown in FIGURE 20. A conical roller 164 (174) is rotated by the shaft 163 proportionally to the course angle $\phi$ and in so doing drives a friction wheel 165 (175) which is adjustable on a square shaft 166 (176) by means of a screw spindle 167 (177). Through a toothed-wheel gear 168 (178) the rotation of the shaft 166 (176) is transmitted to a differential gear 170 (180) and simultaneously through a gear 169 (179) a rotation in fixed relationship to the change of the angle, in such manner that when the friction wheel 165 (175) is located in the central position denoted by 0, the wheel 171 (181) stands still and on displacement of the friction wheel to one or other side out of the central position rotates in one or other direction. The rotation of the wheel 181, proportional to $x$, is transmitted directly through the wheel 172 to the spindle 167 and adjusts the friction wheel 165 in accordance with the value of $x$, while to the rotation of the wheel 171, proportional to the value $\int x . d\phi$, there is also added, by means of the differential gear 185, a rotation which is proportional to the course of travel $\int wdt$ and which is supplied through the shaft 184, in order to obtain a rotation corresponding to the value $y$, which rotation through the gearwheel 182 and the spindle 187 adjusts the friction wheel 175 in accordance with the sum of $\int xd\phi + \int wdt$.

The rotations of the two shafts 167 and 177 corresponding to $x$ and $y$ are transmitted by synchrogenerators 173 and 183 respectively to a cross slide system as illustrated in FIGURE 19 for example. Every time a new reference point P is selected, not only the projection surface but also the calculator must be adjusted to the new coordinate values. In this case the return is advantageously effected jointly for the cross slide arrangement and the calculating apparatus, the V-shaft 184 being rapidly reversed and at the same time temporarily suitably selected $\phi$-values being adjusted.

The apparatuses shown in FIGURES 20 and 21 can be used in combination with any other arrangements serving for recording paths of motion. For example, the sliding contacts 50, 51 of the potentiometers 56, 57 in FIGURES 2 and 3 can be moved in accordance with the coordinates $u$ and $v$. Instead of moving a projection surface relative to north-oriented instantaneous pictures projected there-on, the instantaneous images can also be passed over the stationary projection surface by a mirror adapted to tip about two axes in accordance with the values of $u$ and $v$. Displacement of the sphere in FIGURE 9 may also be composed, taking a north-oriented system of axes as basis, of rotations about two axes corresponding to the coordinates $u$ and $v$, parallel to the south and north direction and the west-east direction respectively, and passing through the centre of the sphere. The sphere is at the same time driven by friction wheels having crossed shafts lying in the plane of the equator.

Instead of the integration apparatuses shown in FIGURES 20 and 21, use may be made of those which effect stage-by-stage integration by summation of mechanical strokes having variable magnitude and frequency.

In the production of a course-oriented picture of paths of motion on the afterglowing screen of a cathode ray tube, for example in accordance with FIGURE 3, it is necessary to rotate the cathode ray tube, in accordance with the changes of course of the observing ship, about its longitudinal axis. The operating voltages and currents must therefore be supplied to the tube through slip rings, this involving additional expenditure and the possibility of disturbances in operation. In order to avoid this, a north-oriented picture is produced on the screen of the cathode ray tube, the latter not being rotated, and the screen picture is viewed through a mirror arrangement, for example a so-called inversion prism, which is rotated in accordance with the changes of course and shows the viewer the screen picture always in a course-oriented position.

So-called inversion prisms are known as optical auxiliary means for the variable rotation of a picture. When a picture is viewed through such a prism, the picture appears laterally reversed, namely with respect to an axis of symmetry to be imagined as being rigidly connected to the prism. If the prism is rotated about the optical axis the laterally reversed picture rotates in the same sense but through twice the angle of the prism. By disposing a second fixed inversion prism in the path of the rays a laterally correct picture is obtained. If the axes of symmetry of the two inversion prisms are parallel, the picture appears in the same position as without the prisms. A joint rotation of both prisms has no effect. The desired rotation of the observed picture can be brought about by rotating the first or the second prisms about the optical axis, with the difference that the prism more remote from the eye should be rotated in the opposite direction to that desired for the rotation of the picture while the prism nearer the eye should be rotated in the same direction as that required of the picture. To make a course-oriented picture from a north-oriented one, the observed picture must in each case be rotated through an angle equal to the course angle but having the reverse sign. Instead of an inversion prism, use may be made of equivalent mirror systems of diverse kinds having an uneven number of reflections. In particular, instead of the fixed inversion prism, a single mirror may be used, and this may be desirable for the purpose of deflecting the direction of viewing. The fixed inversion prism or a corresponding mirror can be dispensed with when the north-oriented general picture on the screen of the cathode ray tube is projected laterally reversed, for example with the north direction as axis of symmetry. Such a picture is obtained in the simplest manner when all the deflection means for the recording electron beam are imagined as being rotated through 180° about an axis parallel to the north direction on the screen.

An arrangement for converting a north-oriented picture into a course-oriented one is shown in FIGURE 22. A north-oriented picture of paths of motion is produced on the screen 186 of a cathode ray tube, for example by the arrangement illustrated in FIGURE 2. On the fixed ring 187 are marked the cardinal points, for example the north direction being marked on the point on the extreme right on the drawing. An arm 188 carries a mirror 189 and a bearing 190 for a ring rotating therein and having an inversion prism 192 fastened therein. At one end, the ring has a tooth rim 193 which meshes with a gearwheel 194, which is rotated in accordance with the changes of course by a servomotor 195 connected to the compass installation. The transmission ratio of the gear is so chosen that the angle of rotation of the ring 191 is equal to half the course angle. Seen from the left, the rotation of the ring 191 is opposed to the changes of course. The eye of the viewer is shown at 196. The viewer views the screen 186 through the inversion prism 192 and through the mirror 189. The illustration shows the prism in the position it has when the ship is travelling on a north course. In the case of an easterly course, the prism 192 would be rotated through 45° to the left, seen from the viewer's position. In the picture of the paths of motion as seen by the viewer, the course direction always extends from bottom to top, in conformity with the usual radar picture. The marks on the ring 187, which are seen simultaneously with the screen through the mirror 189 and the inversion prism 192, still indicate the cardinal points correctly, but change their position to the viewer on changes of course of the observing ship.

When the picture of objects in the surroundings is to be recorded with allowance for the progress of the observing ship and contains the image of a fixed target, a suitable displacement of the initial point of the periodic deflections of the beam can also be obtained without measuring the speed of travel. To this end, the displacement of the initial point is so controlled by a photoelectric cell arrangement that the instantaneous pictures of the fixed target obtained on scanning the surroundings always lie at the same point on the picture surface. Even when the recording of the instantaneous images on the picture surface is effected by afterglow effect, the photoelectric cell control is substantially influenced by the instantaneous images, because the latter have a greater brilliance than the afterglow image. At the same time, any drift of the observing ship is also automatically taken into account. FIGURE 23 shows an arrangement in which there is recorded on the screen 197 of the cathode ray tube 198 of a radar set a picture of the surroundings in which the images of fixed targets do not move and in which the paths of motion of the observing ship and of other ships appear. It is assumed that the picture produced is to be north-oriented. The instantaneous pictures produced on the screen 197 must therefore also be north-oriented. The observing ship is depicted at 199. An afterglow sweep indicates its true course. The picture of a fixed land object appears at 200. In front of the screen 197 is disposed an image-reproducing system 201, which is adjustable to any point of the screen, with a lens 202, which projects a picture of the point to which the system is adjusted onto the quadrantal cathodes 203 of four photoelectric cells. The image-reproducing system 201 is joined to a hinge arrangement 204, by means of which, on movements of the system, the orientation of the quadrants 203 with respect to the image axis or the north direction on the screen is always kept constant. Each two oppositely situated photoelectric cells control, through a circuit 205 or 206 respectively, turning motors 207, 208, which displace the tappings of potentiometers 209, 210. The potentiometers feed two deflection coil pairs 211, 212, which are vertical to one another and which additionally deflect the electron beam and thus displace the initial point of the instantaneous pictures. When the image-reproducing system 201 is adjusted to the point 200 the image of the point produced by the lens 202 falls on the point of intersection of the separating lines betwen the quadrants 203. As long as the instantaneous image of a selected fixed target corresponds to the point 200, all the photoelectric cells are uniformly illuminated and the setting of the potentiometers 209, 210 and the existing displacement of the initial point are not altered. If, on the other hand, an instantaneous image of the fixed target lies beside the point 200, the photoelectric cells are illuminated unevenly and initiate displacement of the initial point of the periodic beam deflections in the sense of a return of the instantaneous images to the point 200.

The construction of the control circuits 205 and 206 respectively is shown in FIGURE 24. A glass vessel 213 encloses four photoelectric cells having a common anode 214 and cathodes which are disposed in accordance with the four quadrants of a circle and of which only an oppositely situated pair 215, 216 are shown in the drawing. The currents of the photoelectric cells flow through two high resistances 217, 218, which are disposed in the grid circuit of two electronic tubes 219, 220 and regulate the anode currents of said tubes in accordance with the illumination of the photoelectric cathodes 215, 216. The anode currents flow through the two opposition-connected field windings 221, 222 of a direct-current motor, the armature 223 of which is fed with a constant current and through a shaft 224 drives a screw spindle for displacing the sliding contact of one of the potentiometers 209, 210. If one of the two photoelectric cathodes is illuminated by the image of a fixed target more brightly than the other, the armature 223 rotates in a direction such that the image of the fixed target is returned to the centre between the two photoelectric cathodes.

What we claim is:

1. A navigational apparatus for indicating the true course of a ship and of other craft in its vicinity on a recording surface, comprising radar means including a cathode ray tube, installed on said ship for producing on the screen of said cathode ray tube a plan-position picture with the ship as origin, means for maintaining said picture in a stabilized direction wherein true north of said picture is held constant, a recording surface in the shape of a sphere, bearing means freely rotatably supporting said sphere for movement about its center, optical means for projecting said plan-position picture onto the surface of said sphere, said sphere having a radius which is large with reference to the diameter of the area onto which said picture is projected whereby said area appears approximately flat, means engaging the sphere for imparting rotations to it in correspondence with the heading and speed of the ship whereby the image spots corresponding to the ship and other craft respectively trace the true courses of the ship and other craft on the surface of the sphere.

2. A navigational apparatus for indicating the true course of a ship and of other craft in its vicinity on a recording surface, comprising radar means including a cathode ray tube installed on said ship for producing on the screen of said cathode ray tube a plan-position picture with the ship as origin, means for maintaining said picture in a stabilized direction wherein true north of said picture is held constant, a recording surface in the shape of a sphere, optical means for projecting said plan-position picture onto the surface of said sphere including means for projecting the origin of said picture as a beam onto said sphere at a fixed point, said sphere having a radius which is large with reference to the diameter of the area onto which said picture is projected whereby said area appears approximately flat, bearing means freely rotatably supporting said sphere for movement about its center, means engaging said sphere for imparting concentric surface movement to it in relation to the speed and in selected relation to the ship's heading, said sphere having means for retaining a series of successive pictures whereby said fixed beam will trace a linear image of the movement of said ship as the sphere moves relative to it and with the courses of said other craft traced relative to the image formed by said beam.

3. A navigational apparatus for indicating the true course of a ship and of other craft in its vicinity on a recording surface, comprising radar means including a cathode ray tube installed on said ship for producing on the screen of said cathode ray tube a plan-position picture with the ship as origin, means for maintaining said picture in a stabilized direction wherein true north of said picture is held constant, a recording surface in the shape of a sphere, optical means for projecting said plan-position picture onto the surface of said sphere including means for projecting the origin of said picture as a beam onto said sphere at a fixed point, said sphere having a radius which is large with reference to the diameter of the area onto which said picture is projected whereby said area appears approximately flat, bearing means freely rotatably supporting said sphere for movement about its center, means engaging said sphere for imparting concentric surface movement to it including means for moving said surface at a rate corresponding to the speed of said ship and in a direction at said beam opposite the direction of movement of said ship, said sphere having means for retaining a series of successive pictures whereby said fixed beam will trace a linear image of the movement of said ship in a direction on said sphere corresponding with the compass direction of said ship's heading.

4. An arrangement as claimed in claim 1, wherein said means engaging said sphere include a pair of friction wheels which lie against said sphere surface and are disposed symmetrically to the said fixed beam, means for driving said wheels including a differential gear, means adapted to drive said wheels in the same direction in accordance with the speed of travel of the observing ship and another set of differential gear means adapted to drive said wheels in opposite directions according to changes of course of the observing ship.

5. An arrangement set forth in claim 1 wherein said sphere is mounted between rollers permitting rotations about any desired axes, and the magnitude of the radius of the sphere in relation to said area is such that said area can be regarded approximately as plane.

6. Navigation apparatus for indicating the true courses of a ship bearing said apparatus and of other craft in its vicinity on a recording surface, comprising radar equipment installed on said ship for producing on the screen of a cathode ray tube a plan-position picture with the ship represented by an image spot as origin in which the direction corresponding to the ship's instantaneous heading is held constant, an image retaining surface in the shape of a sphere mounted between bearing means adapted to freely rotate about its center, optical means for projecting an image of the plan-position picture onto the surface of the sphere, the radius of which is large with reference to the diameter of the area onto which said picture is projected whereby said area appears approximately flat, means engaging the sphere for imparting rotations to it about an axis passing through the center of the sphere and said constant image spot corresponding to said ship, and in accordance with and in a direction opposite to variations of the ship's heading, additional means for causing displacement of the surface of the sphere relative to said constant image spot corresponding to said ship relative to the speed of the ship, and in a direction opposite to its instantaneous heading, whereby the images projected onto said sphere indicate the instantaneous positions of the ship and other craft, and the successive positions which are recorded trace the courses of said ship and other craft with the instantaneous direction of the course of said ship stabilized for an observer.

7. A navigational apparatus for indicating the true course of a ship and of other craft in its vicinity on a recording surface, comprising radar means including a cathode ray tube installed on said ship for producing on the screen of said cathode ray tube a plan-position picture with the ship as origin and in which the direction corresponding to the ship's heading remains stationary, means for projecting the plan-position picture on a recording surface, means for rotating the recording surface about the origin of the projected plan-position picture in correspondence with and in directions opposite to the ship's heading and means for displacing the recording surface in a direction and at a rate so as to cause progressive relative displacement of the projected picture over the recording surface in the direction of the ship's instantaneous heading in the picture and in correspondence with the speed of the ship.

8. In combination with an arrangement as set forth in claim 6 additional means for stabilizing the plan-position picture on the screen of the cathode ray tube with regard to the position of the compass points in the picture, alternative means for producing relative displacement of the projected picture on the recording surface in the instantaneous direction of the ship's heading in the picture, switching means for making operative said additional and alternate means for stabilizing the display of the true courses with regard to the position of the compass points in the display immediately preceding the operation of the switching means.

References Cited in the file of this patent

UNITED STATES PATENTS

| | | |
|---|---|---|
| 2,616,077 | Holser | Oct. 28, 1952 |
| 2,701,352 | Kingdon | Feb. 1, 1955 |
| 2,750,247 | Turner | June 12, 1956 |
| 2,804,613 | Haworth | Aug. 27, 1957 |

FOREIGN PATENTS

| | | |
|---|---|---|
| 611,770 | Great Britain | Nov. 3, 1948 |